United States Patent

Carossi et al.

[15] 3,697,868
[45] Oct. 10, 1972

[54] FREQUENCY CONTROLLED HARTLEY OSCILLATOR CIRCUIT FOR NON-DESTRUCTIVE EDDY CURRENT TESTING OF AN ELECTRICALLY CONDUCTIVE MATERIAL

[72] Inventors: Jean-Claude Carossi, Manosque; Jean-Pierre Dufayet, Aix-en-Provence; Roger Dujardin, Gambois, all of France

[22] Filed: Nov. 13, 1969

[21] Appl. No.: 876,257

Related U.S. Application Data

[63] Continuation-in-part of Ser. No. 815,715, April 14, 1969, abandoned.

[30] Foreign Application Priority Data

Oct. 17, 1968 France..................170227

[52] U.S. Cl. .................................324/40
[51] Int. Cl. ..............................G01r 33/12
[58] Field of Search................324/37, 40

[56] References Cited

UNITED STATES PATENTS

| | | | |
|---|---|---|---|
| 2,894,203 | 7/1959 | Cory | 324/40 |
| 3,117,293 | 1/1964 | Mortley | 307/320 |
| 2,920,269 | 1/1960 | Hanysz et al. | 324/40 |
| 3,135,914 | 6/1964 | Callan et al. | 324/40 |

FOREIGN PATENTS OR APPLICATIONS 1,470,386  1/1967  France..................324/40

*Primary Examiner*—Rudolph V. Rolinec
*Assistant Examiner*—R. J. Corcoran
*Attorney*—Craig, Antonelli and Hill

[57] ABSTRACT

A method of non-destructive eddy-current testing of the characteristics of electrically conductive parts wherein the part to be inspected is introduced inside an induction winding connected at an intermediate point to the electrode which serves as cathode of an active electronic device, said winding being intended to serve both as a coil for generating an alternating magnetic field which produces eddy currents within said part and as a coil for detecting the field induced by said currents, and wherein an alternating-current voltage is applied to said active device and a given type of defect exhibited by said part is detected by studying the resultant changes according to the frequency of said alternating-current voltage in the voltage collected at the electrode which serves as a grid of the active device and/or in the terminal voltage of said winding.

4 Claims, 10 Drawing Figures

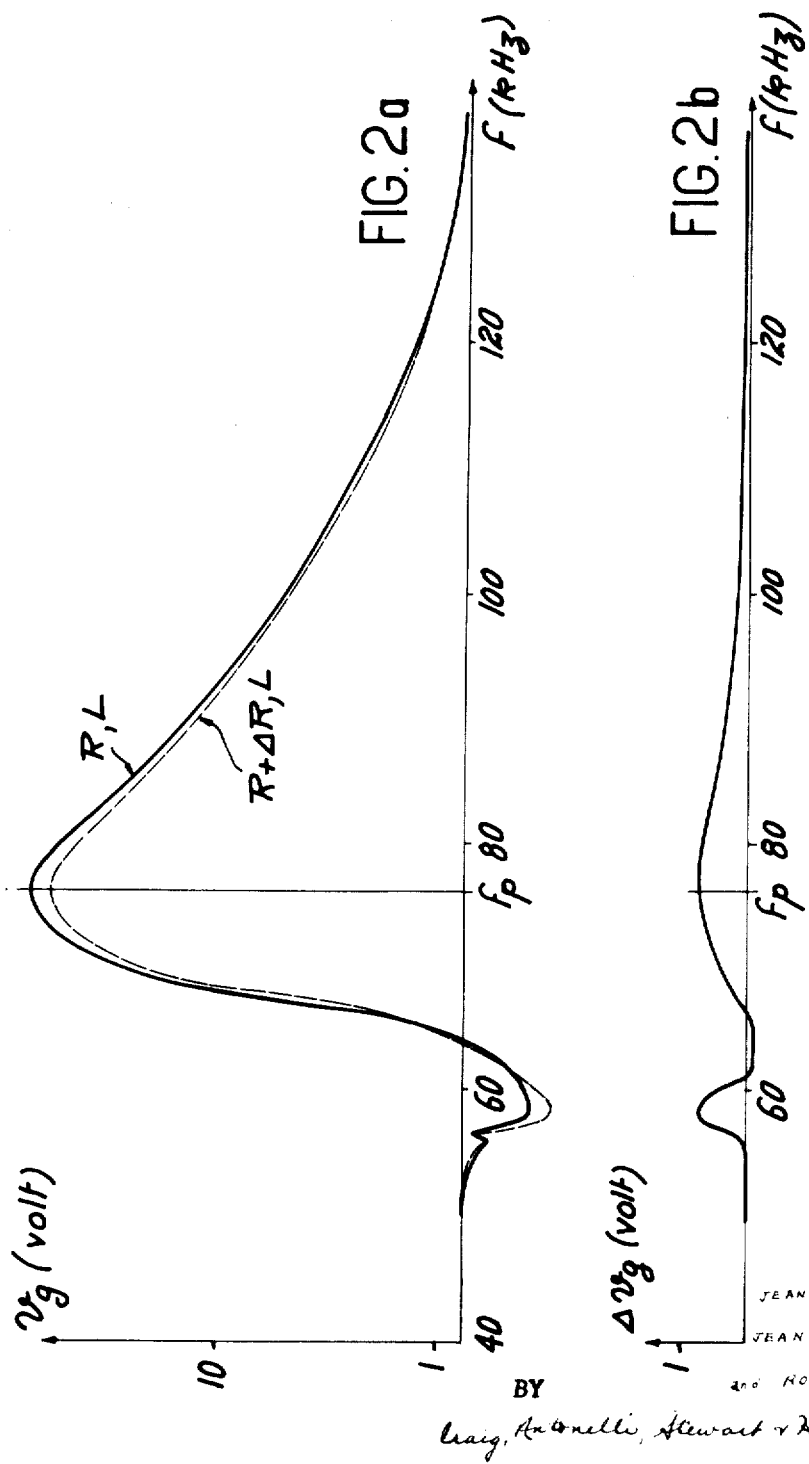

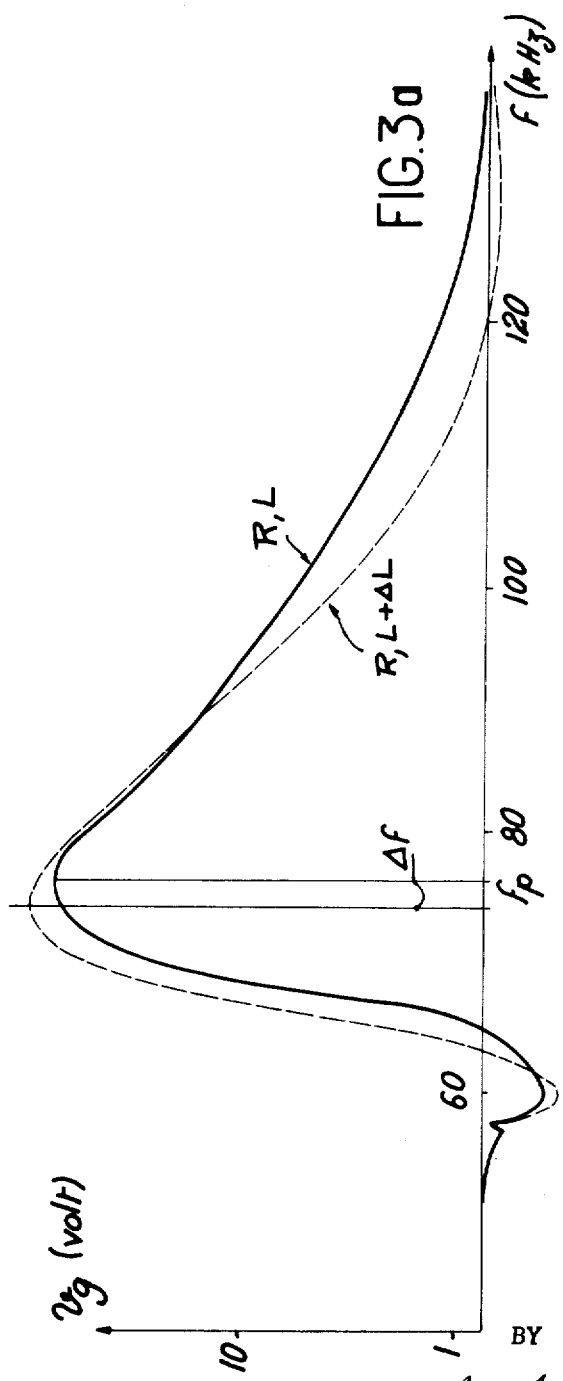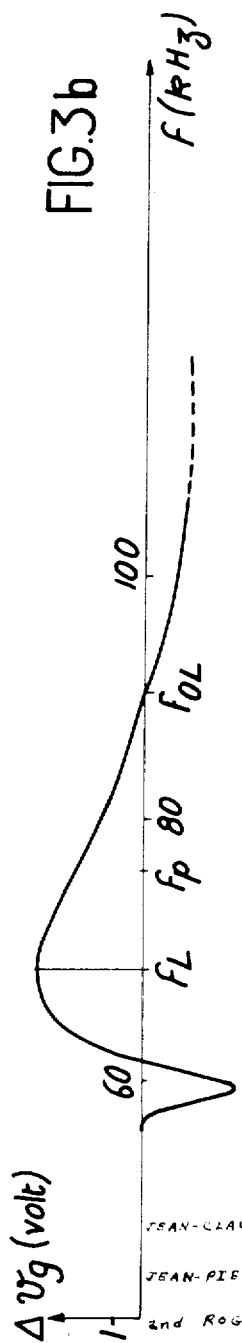

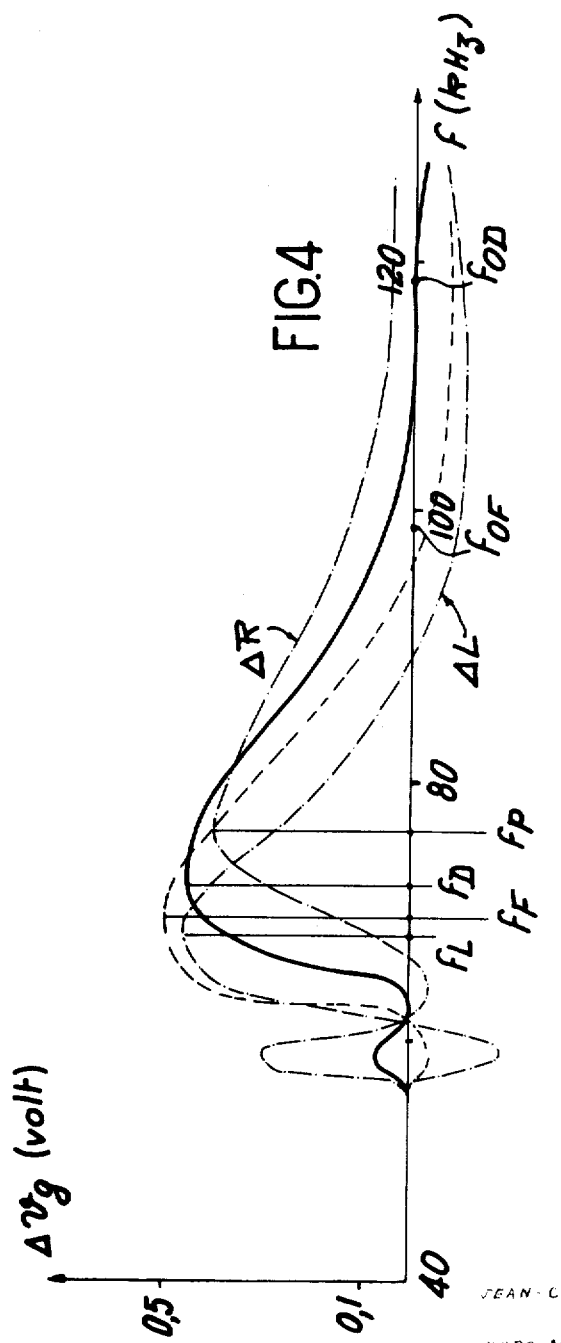

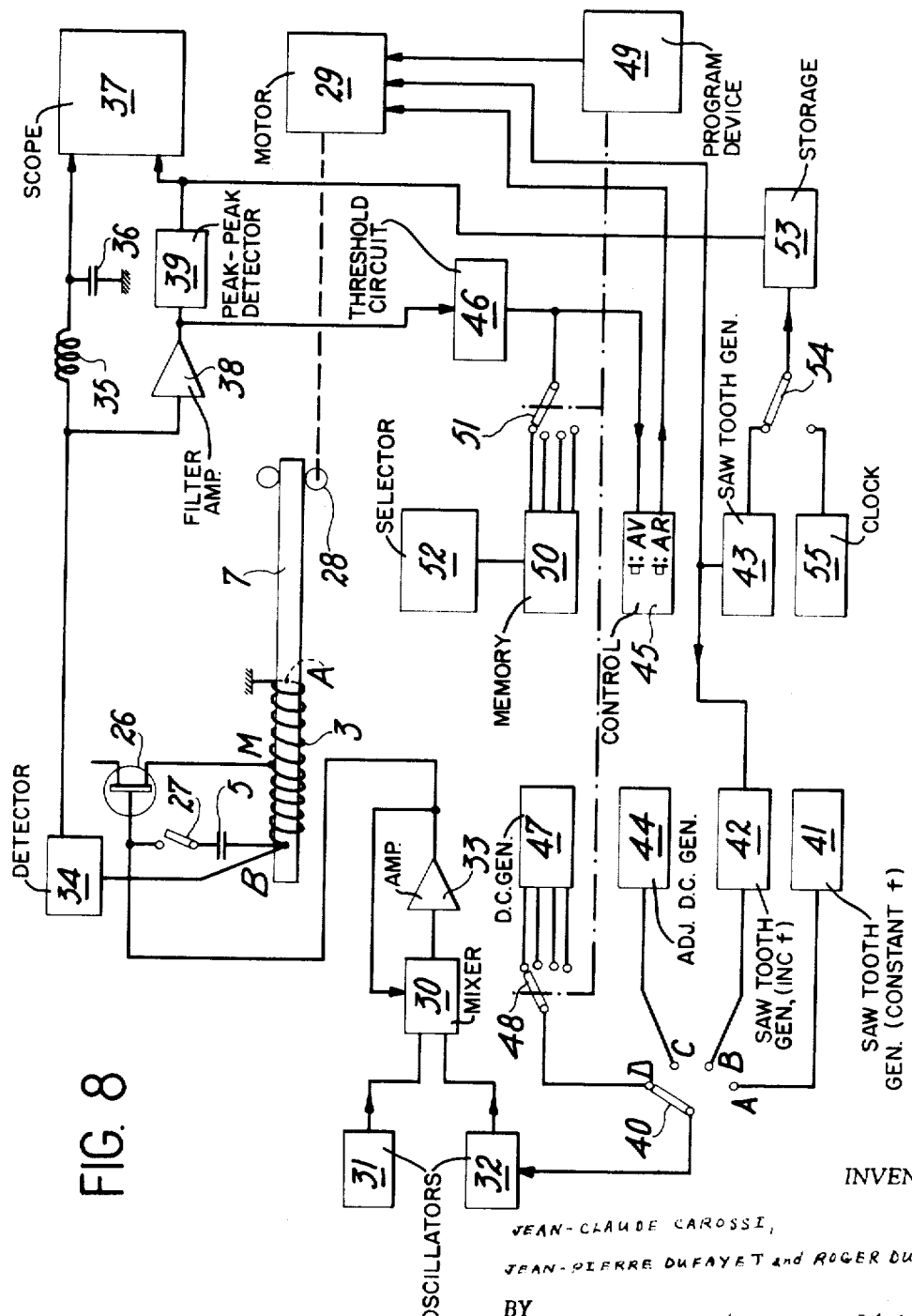

FREQUENCY CONTROLLED HARTLEY OSCILLATOR CIRCUIT FOR NON-DESTRUCTIVE EDDY CURRENT TESTING OF AN ELECTRICALLY CONDUCTIVE MATERIAL

This application is a continuation-in-part of application Ser. No. 815,715 filed Apr. 14, 1969, now abandoned.

This invention has for its object a method of non-destructive testing by means of eddy currents of characteristics of electrically conductive tubes and, in particular, of non-ferromagnetic tubes and pins of nuclear fuel. The invention also relates to an apparatus for carrying out said method.

In order to check the physical properties of an electrically conductive part, it is known to place said part within the interior of the coil of a so-called Hartley oscillator which performs the function both of a coil for generating an alternating magnetic field which produces eddy currents within said part and of a coil for detecting the field which is induced by said eddy currents. Under these conditions, any changes in the physical constants of the part which arise in particular from flaws are detected by means of variations in the voltage collected at the terminals of the coil.

The present invention proposes a method of non-destructive testing which is also based on the detection of eddy currents in parts which are being inspected but permits distinctly improved performances compared with the method referred-to in the foregoing, especially in regard to identification of the nature of flaws.

More specifically, this invention is directed to a method of non-destructive testing by means of eddy currents of the characteristics of electrically conductive parts, wherein the part to be inspected is introduced inside an induction winding connected at an intermediate point to the electrode which serves as cathode of serve both as a coil for generating an alternating magnetic field which produces eddy currents within said part and as a coil for detecting the field induced by said currents. Said method essentially entails the application of an alternating-current voltage to the electrode which performs the function of grid of said active device and the detection of a given type of defect exhibited by said part by studying the resultant changes, according to the frequency of said alternating-current voltage, in the grid voltage of the active device and/or in the terminal voltage of said winding.

The invention is also concerned with an apparatus which permits the application of the method and which essentially comprises an electronic circuit constituted by at least one induction winding and one active device in which the electrode serving as cathode is connected to an intermediate point of said winding, an alternating-current voltage generator coupled to said circuit, a system for controlling the frequency of the voltage delivered by said generator and means for determining the variations according to said frequency in the voltage collected at the electrode which serves as the grid of said circuit and/or in the voltage developed across the terminals of said winding.

Further properties of the invention will be brought out by the following description, reference being made to the accompanying drawings in which a number of different embodiments of said apparatus are given by way of explanation but not in any limiting sense, and in which:

FIGS. 2a and 2b illustrates the influence exerted on the grid voltage $v_g$ of the tube of a Hartley oscillator by a variation in the apparent resistance of the winding of said oscillator;

FIGS. 3a and 3b illustrates the influence exerted on said voltage $v_g$ by a variation in the apparent inductance of the winding;

FIG. 4 illustrates the influence exerted on the voltage $v_g$ by a crack and by a variation in size of an electrically conductive part which is inserted in said winding;

and finally FIG. 8 is a diagram of a very elaborate design of the apparatus in accordance with the invention.

Figure 1:
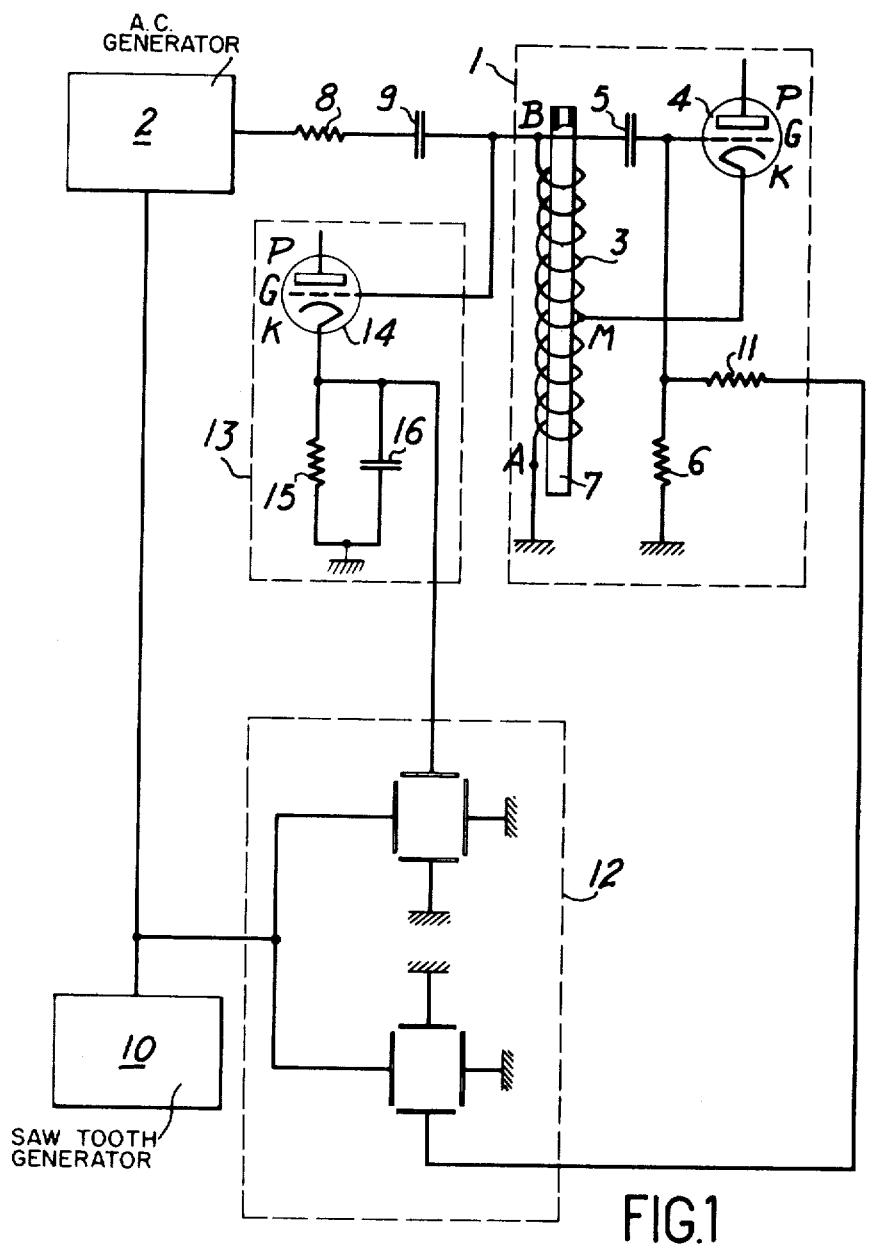
FIG. 1 is a diagram of the apparatus in accordance with the invention as equipped with a system of visual indication of the reactions of said apparatus to a defect exhibited by an electrically conductive part which is subjected to testing of its properties.

The apparatus in accordance with the invention as illustrated in FIG. 1 is constituted by the association of a Hartley oscillator 1 and an alternating-current generator 2.

The Hartley oscillator 1 consists of a winding 3, the ends A and B of which are connected in one case directly to ground and in the other case to the grid of a vacuum tube 4 which forms the active element by means of a capacitor 5. The winding is provided with an intermediate tapping M which is connected directly to the cathode of the vacuum tube 4. The grid is also connected to ground through a resistor 6 which constitutes the automatic bias resistor of the circuit. The part 7 to be inspected which may be a tube, for example, is inserted within the winding 3. It is known that, under these conditions, the winding 3 performs the function both of a coil for generating an alternating magnetic field and of a coil for detecting the field induced by the eddy currents within the tube 1.

The alternating-current voltage generator 2 which has a frequency range extending from 1 kc/s to 1 Mc/s is connected to the end B of the winding 3 through a resistor 8 and a capacitor 9. In order to form the capacitance of its oscillating circuit, the generator makes use of a diode referred-to as a Varicap, the capacitance of which varies with its bias voltage; thus, the frequency of the generator is determined by the bias voltage of the Varicap. This bias voltage is produced by a saw-tooth signal generator 10 which permits cycling sweeping of a frequency range comprised between a few tens and a few hundreds of kc/s.

A dual-beam oscilloscope 12 is employed to produce a visual display of the curve which represents the variation, as a function of the frequency f of the voltage delivered by the generator 2, on the one hand of the voltage $v$ which is collected at the end B of the winding 3 and on the other hand of the grid voltage $v_g$ which is collected at the terminals of the automatic bias resistor 6 by means of resistor 11 for high frequency.

The alternating-current voltage $v$ is first subjected to a detector-demodulator system 13 having a high input impedance. This system is essentially constituted by a vacuum tube 14, said voltage $V$ being applied to the grid of said tube while the cathode of this latter is connected to a filter circuit consisting of a resistor 15 and capacitor 16 connected in parallel.

The voltage which is collected at the terminals of the filter circuit is applied between the vertical deflection plates of one of the beams of the oscilloscope 12 while the voltage $v_g$ is applied to the same plates of the other beam. The horizontal deflection plates receive the signals which are derived from the saw-tooth signal generator 10.

The shape of the curve $v_g$ or so-called curve of sensitivity of the apparatus which is displayed on the screen of the oscilloscope 12 is shown in FIG. 2a and appears:

in full lines a value $R$ of the apparent resistance (resistive factor) of the winding 3, in broken lines a value $R + \Delta R$ of said resistance while the value $L$ of the apparent inductance (active factor) remains constant.

It is observed that the two curves have different amplitudes but that they exhibit a maximum at the same frequency $f_p$ which is the natural frequency of the Hartley oscillator 1 as defined by the relation:

$$f_p = \frac{1}{2\pi\sqrt{LC}}$$

wherein $L$ and $C$ designate respectively the values of the inductance of the winding 3 and of the total capacitance which is connected to the terminals of said winding.

If the curve corresponding to the voltage differences $\Delta v_g$ resulting from a variation $\Delta R$ is then plotted as shown in FIG. 2b, the frequencies at which the sensitivity to a variation of the resistive factor is of maximum value as well as the frequencies of insensitivity are clearly discernible, one of the maximum values being located exactly at the frequency $f_p$.

The shape of the same curve $v_g$ as displayed on the screen of the oscilloscope is shown in FIG. 3a:

in full lines in the case of a value $L$ of the apparent inductance of the winding 3, in broken lines in the case of a value $L + \Delta L$ of said inductance while the value $R$ of the apparent resistance remains constant.

In this case, the variation $\Delta L$ causes a displacement of the maximum value of the curve by a value $\Delta f$ such that:

$$\Delta f = -\tfrac{1}{2}(f_p)(\Delta L)/(L)$$

a displacement towards the left-hand side therefore takes place while the amplitude of the oscillation increases substantially in proportion to the improvement of the quality factor of the coil.

As shown in FIG. 3b, the corresponding curve of the voltage differences $\Delta v_g$ resulting from a variation $\Delta L$ exhibits a maximum value of sensitivity to a variation of the reactive factor a frequency $f_L$ which is distinctly lower than the natural frequency $f_p$. There also appears above $f_p$ a sensitivity nullification frequency $f_{oL}$, the sign of $\Delta v_g$ being reversed beyond this frequency.

Thus, the curves of sensitivity to a variation in real resistance (FIG. 2b) and to a variation in real inductance (FIG. 3b) are clearly distinguished from each other by:

the frequency which corresponds to the maximum value of sensitivity ($f_p$ in the first case, $f_L$ in the second case), the existence of a frequency $f_{oL}$ which corresponds to nullification of sensitivity to a variation in inductance.

In point of fact, it is known that a flaw exhibited by the tube 7 under inspection causes both a variation $\Delta R$ in the apparent resistance $R$ and a variation $\Delta L$ in the apparent inductance $L$. If the curve $v_g$ is therefore plotted as a function of the frequency in the presence of a flaw in the tube, said curve will be located in positions which will take into account both the component $R$ and the component $L$. Depending on the nature of the flaw or defect, the curve $\Delta v_g$ as a function of the frequency can therefore be defined by:

the frequency which corresponds to the maximum value of sensitivity, the frequency at which the sensitivity is zero or of little apparent value.

FIG. 4 gives by way of example the curves $\Delta v_g$ obtained in the case of a dimensional defect of the test-piece or tube (as shown in full lines) such as a local variation in diameter and in the case of a crack (shown in broken lines).

If these curves are compared with the curves of FIGS. 2b and 3b (indicated in chain-dotted lines), it is apparent that the dimensional defect is more closely related to a variation $\Delta R$ while the crack is more closely related to a variation $\Delta L$.

In addition, it is found that the dimensional defect produces a curve $\Delta v_g$ characterized by:

a maximum-sensitivity frequency $f_D$ which is lower than the frequency $f_p$, a sensitivity nullification frequency $f_{oD}$ of high value.

The curve resulting from a crack in the tube is totally different from the preceding and is characterized by:

a maximum-sensitivity frequency $f_F$ which is lower than the frequency $f_D$, an intermediate nullification frequency $f_oF$ between $f_p$ and $f_{oD}$.

A similar study of the shape of the curve $V$ which is displayed on the screen of the oscilloscope also serves to define for each type of defect a frequency which corresponds to the maximum value of sensitivity and a frequency at which the sensitivity is zero or of very low value.

Thus, the apparatus herein described which results from the electric coupling of a Hartley oscillator for setting up eddy currents within a metallic tube with another alternating-currents voltage generator produces a totally different response in the case of each type of defect.

In practice, immediate detection and identification of a defect exhibited by a tube 7 can be achieved by means of the apparatus shown in FIG. 1 by inserting said tube within the winding 3 and by sweeping a frequency band which extends around the natural frequency $f_p$ of the Hartley oscillator. The displacements and deformations of the curve $v_g$ and/or of the curve $V$ which result from the passage of a defect within the winding 3 are then followed on the screen of the oscilloscope 12. Taking into account the remanence of the screen of the oscilloscope and subject to the choice of a sweep time which is sufficiently short to be negligible compared with the time of transition of the defect within the detection zone of the coil, it is possible in fact to localize those portions of the curves which are displaced and those which remain unchanged and thus to identify the type of defect.

It is apparent that this detection of defects by comparison of the curve which corresponds to the absence of a defect with the curve which corresponds to the presence of a defect as made visually in this case by the operator can be carried out with a considerably higher degree of precision by means of an electronic computer. For example, as each transition of the defect takes place, the computer plots the curve $\Delta v_s$ and/or the curve $\Delta V$ and identifies this defect by comparing this curve with standard reference curves or by means of the different frequencies which are characteristic of each curve.

Figure 5:
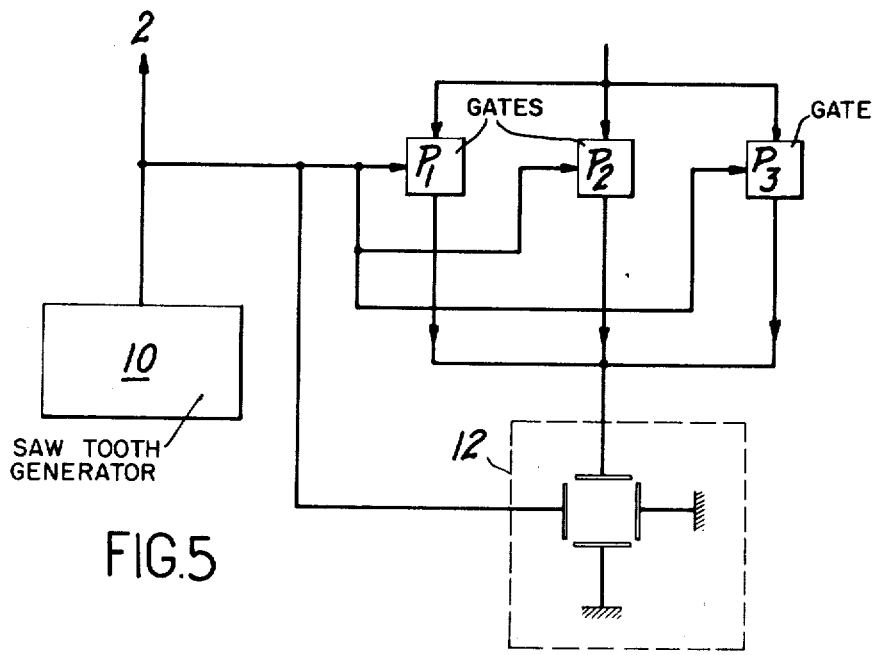
FIG. 5 represents the circuit arrangement which is employed for sampling the voltage $v_g$ or the voltage V which is developed across the terminals of the winding.

This comparison can also be made by means of a fairly simple device shown in FIG. 5 which carries out a sampling of the voltage delivered by the apparatus ($v_s$ or $V$). This device is essentially constituted by a series of gates $P_1, P_2 \ldots P_n$ having a variable threshold (limited to three in number in the figure), the voltage to be sampled being applied to each input of said gates whilst each output supplies the vertical deflection plates of the oscilloscope 12. Opening of these gates is controlled by the saw-tooth pulse generator 10 which defines the frequency sweep time. The gates $P_1, P_2 \ldots P_n$ allow the voltage to be sampled to pass towards the oscilloscope for a period of a few microseconds respectively in the case of the levels $u_1, u_2 \ldots u_n$ of the signal delivered by the generator 10, with the result that a point representing the value of said voltage at the frequencies $f_1, f_2 \ldots f_n$ is displayed on the screen at each sweep cycle. Since each type of defect is associated with at least one characteristic frequency, the thresholds $u_1, u_2 \ldots u_n$ can be chosen so that the corresponding frequencies $f_1, f_2 \ldots f_n$ constitute the frequencies which are characteristic of the defects to be detected.

Thus, a defect at the frequency $f_n$ will be identified if the point of the screen representing the value of the voltage taken at that frequency $f_n$ is displaced vertically with respect to the position which it occupies in the absence of a defect corresponding to the tube or material being examined.

This device can be improved by adding at the output of each gate a counter-voltage which nullifies the voltage released in the absence of any defect so that only defects can give rise to a visual display on the screen.

In the foregoing, the detection and identification of defects have been achieved by sweeping a frequency band which extends on each side of the natural frequency $f_p$ of the oscillator. However, especially when it is necessary to locate a given type of defect, it is also possible to make use of a predetermined frequency which is selected from a zone in which the sensitivity to this type of defect is as high as possible and the sensitivity to the other types of defects is as low as possible and to follow at this frequency the variations of $v_s$ and/or of $V$.

Figure 6:
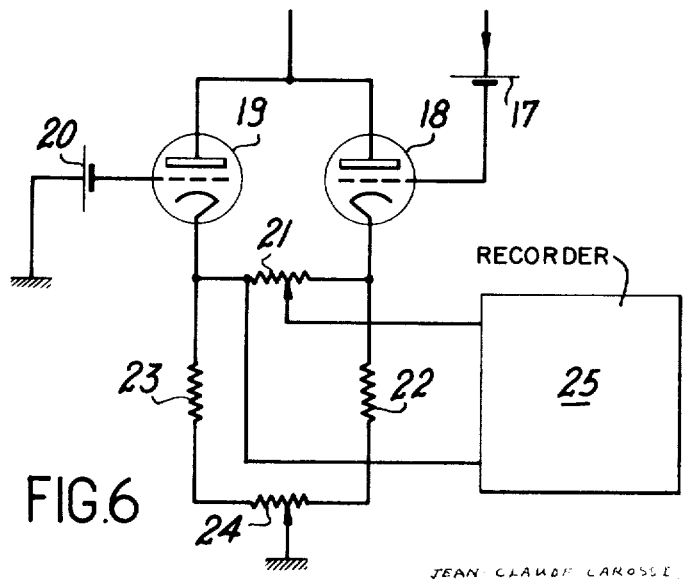
FIG. 6 represents a circuit arrangement for recording at a given frequency variations in the voltages $v_g$ or V.

In this case, the saw-tooth generator 10 is therefore put out of service and replaced by a direct-current voltage generator which sets the test frequency; the oscilloscope 12 is replaced by a recording device. The voltages $v_s$ and $V$ can nevertheless not be fed directly to this recording device but are previously subjected to an electronic balance, the circuit diagram of which is shown in FIG. 6.

The voltage to be recorded is first subjected to a counter-voltage 17, then drives the grid of a first triode 18. The plate of said triode is connected to the plate of a second triode 19, the grid of which is connected to ground by means of a balancing voltage 20. The cathodes of the triodes 18 and 19 are connected on the one hand to each other through a potentiometer 21 and on the other hand to ground through the resistors 22 and 23 respectively and through a part of the common balancing resistor 24. The voltage to be recorded is taken from the potentiometer 21 and fed into the recording device 25.

Figure 7:
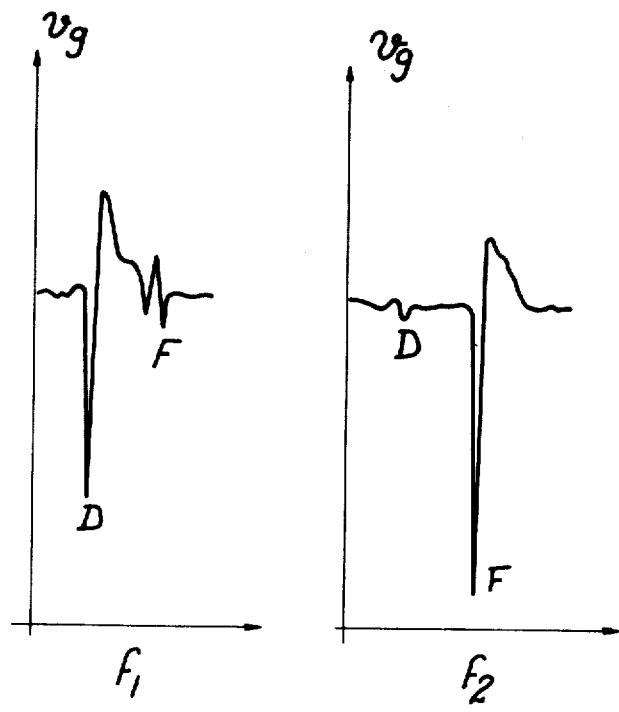
FIG. 7 shows the results obtained by means of the circuit of FIG. 6.

FIG. 7 illustrates by way of example the recordings of the voltage $v_s$ which are obtained at two different frequencies $f_1$ and $f_2$ in the case of a tube having a dimensional defect (peak $D$) and an external crack (peak $F$). It is apparent that, at the frequency $f_1$, the peak $D$ appears much more sharply than the peak $F$ whereas the opposite effect takes place at the frequency $f_2$.

There is shown in FIG. 8 a very elaborate embodiment of the apparatus in accordance with the invention which permits the determination of the characteristic frequencies of each type of defect and automatic production-line inspection with a possibility of controlling an apparatus for selecting defective tubes.

In this case, the active element of the Hartley oscillator is a field-effect transistor 26, the source of which is connected to the intermediate point M of the winding 3 while the grid to which the voltage is applied at variable frequency is connected to the point B through the capacitor 5 which can be put out of service by means of a switch 27. The Hartley oscillator then becomes an amplifier which operates linearly as distinct from the usual form of Hartley oscillator. The tube 7 to be tested which is placed inside the winding 3 can be displaced within this latter under the action of transfer rollers 28 which are driven by a motor 29.

The variable-frequency voltage is obtained by applying two voltages to a mixing circuit 30, one voltage being derived from an oscillator 31 having a fixed frequency (30 Mc/s) while the other voltage is derived from an oscillator 32 having a variable frequency which makes use of a Varicap to form the capacitance of its oscillating circuit.

In order to stabilize the amplitude of the voltage which is derived from the mixer 30, the voltage is introduced into a negative-feedback amplifier 33 at the level of said mixer. The voltage applied to the grid of the transistor 26 is the voltage which is delivered by said amplifier.

The voltage $V$ which is collected at the point B of the winding 3 is detected by the circuit 34 and transmitted at low impedance to a low-pas filter constituted by a conventional circuit comprising an inductance coil 35 and capacitor 36, then applied to the input of an oscilloscope 37. The same voltage $V$ is fed into a variable-gain amplifier 38 acting as an active filter which is followed by a peak-to-peak detector circuit 39 which also feeds into the oscilloscope 37 a voltage representing the variation in voltage generated as a result of the presence of a flaw in the tube.

A four-position selector switch 40 serves to apply to the Varicap of the oscillator 32 a bias voltage which is delivered:

in position A by a generator 41 for producing saw-tooth signals having a constant recurrence frequency (100 c/s) which cause the voltage applied to the transistor 26 to carry out the cyclic sweeping of a range of frequencies extending from the value $f$ to the value $f + \Delta f$, the values $f$ and $\Delta f$ being adjustable by means of two potentiometers, not shown;

in position B by a device 42 for generating saw-tooth signals which increase in successive steps and produce a variation in the frequency of said voltage from the value $F$ to the value $F + \Delta F$ in a series of uniformly spaced stages, the values $F$ and $\Delta F$ being adjustable by means of two potentiometers which are not illustrated; the length of one stage, that is to say the time during which the coupling voltage retains a predetermined frequency, is defined by another saw-tooth signal generator 43 and corresponds to the time which is necessary to ensure that the motor 29 causes the tube 7 to carry out a single pass through the coil 3 (a few centimeters);

in position C by a generator 44 which produces a direct-current voltage whose value is adjustable by means of a potentiometer and which maintains the voltage delivered to the transistor 26 at a fixed frequency $F_o$; by means of two push-buttons AV and AR, a control system 45 serves to rotate the motor 29 either in one direction or in the other, depending on the desired direction of motion of the tube; the voltage delivered by the active filter 38 is applied to the input of a threshold circuit 46 : when said voltage attains a sufficient value to trigger the threshold circuit, said circuit transmits in the direction of the control system 45 a signal which has the effect of stopping the transfer motor 29;

in position D by a direct-current voltage generator 47 associated with a selector switch 48 having four positions corresponding to four different voltages which are applied to the Varicap, the values of which can be adjusted by means of potentiometers and which fix the frequency of the coupling voltage at values $F_o$ (this value being identical with that which is set at C), $F_1$, $F_2$ and $F_3$; a program device 49 which controls in the case of each tube to be inspected a sequence of four passes through the winding 3 (two outgoing passes and two return passes) and controls the four positions of the selector switch 48 at the same time in order to ensure that each of the four passes is carried out in respect of each of the four frequencies $F_o$, $F_1$, $F_2$ and $F_3$.

The threshold circuit 46 is also connected at the output to a memory device 50 which makes use, for example, of four bistable devices. By means of a selector switch 51 which is also controlled by the program device 49 in synchronism with the selector switch 48, said bistable devices successively change to state 1 or remain in the initial state 0 depending on whether the threshold circuit has been triggered or not by the voltage delivered by the filter 38 in the case of each of the four frequencies $F_o$, $F_1$, $F_2$ and $F_3$. Depending on the state of said four bistable devices at the end of each sequence of four passes, a control device can produce action on a selecting apparatus 52 which ensures automatic removal of defective tubes.

When the apparatus is operating in position B of the selector switch 40, the voltage derived from the detector circuit 39 is recorded in the case of each frequency defined by the device 42 in an assembly of analog storage devices 53. In this case, if the number of operating frequencies is $n$, each tube under inspection is caused to carry out $n$ passes within the coil 3; the saw-tooth signal generator 43 then carries out in synchronism with the $n$ stages the switching of the storage devices and the initiation of $n$ passes. When the last stage has been completed, a selector switch 54 automatically connects the assembly 53 to a reading clock 55 which causes the content of the storage devices to be transferred to the oscilloscope 37.

The apparatus which is illustrated in FIG. 8 has four modes of operation which correspond to the four positions of the selector switch 40. Positions A, B and C serve to determine in the case of a given type of tube the characteristic parameters of each defect which can impair the quality of said tube. Position C corresponds to an automatic operation for the quality control of tubes in large quantities in conjunction with the operation of the selection device which removes defective tubes. The apparatus can operate either with a Hartley oscillator or with a selective amplifier, the changeover from the first to the second being carried out by opening the switch 27, thereby simply cutting out of circuit the capacitor 5 which is connected between the grid of the field-effect transistor 26 and the point B of the winding 3. The amplifier which operates linearly in contradistinction to the Hartley oscillator permits measurements which are less subject to variations and offers the possibility of modifying the ratio of the number of turns of the two sections of the winding 3.

In the mode of operation in position A of the selector switch 40, the curve of sensitivity of the apparatus is obtained on the screen of the oscilloscope 37. By inserting tubes having known defects into the winding 3, it is therefore possible to determine in the case of each type of defect the frequency $F_o$ of the maximum value of sensitivity and if necessary the frequency at which said sensitivity becomes either zero or of very low apparent value. It is also possible to obtain on the screen of the oscilloscope the curve which represents in the case of each type of defect the value of the voltage delivered by the detector 39 as a function of the operating frequency and to note in particular the value of said voltage at the frequency of the maximum level of sensitivity.

In the mode of operation of the selector switch 40 in position B, the use of a different operating frequency in the case of each of the n passes of a tube having a known defect makes it possible after the content of the analog storage devices of the assembly 53 has been transferred into the oscilloscope 37 to display on the screen of this latter n values of the voltage detected by the detector 39 which therefore represent the characteristic curve of said defect. By repeating this operation with tubes having different types of known defects, there is thus made available a series of curves which serve to define in the case of each type of defect frequencies $F_1$, $F_2$, $F_3$ which, with the frequency $F_o$, provide a highly effective means of distinguishing this type of defect.

In the mode of operation in position C of the selector switch 40, the threshold of the circuit 46 being adjusted to a level which is characteristic of one type of defect (determined in the mode of operation in position A) and the voltage delivered by the generator 44 being so adjusted that the voltage applied to the grid of the transistor 26 should have the frequency $F_0$ corresponding to said defect, the tubes are transferred by means of the push-buttons AV and AR of the control system 45. When the threshold circuit is released, the motion of the tube is stopped and the presence of the defect to be found is thus accurately indicated within the coil.

In the mode of operation in position D of the selector switch 40, the apparatus carries out automatic quality control of tubes in large quantities. The tubes automatically undergo four passes within the coil at frequencies having successively the values $F_0$, $F_1$, $F_2$ and $F_3$ which provide perfect definition of any one type of defect. For example, if the storage device 50 indicates that the threshold circuit has been triggered at least once during these four passes, the tube in that case is automatically removed by the selection apparatus 52. Since the same operation is repeated for all types of defects to be found, the tubes which are removed by the selection apparatus 52 are thus grouped in types of defect.

It is to be understood that the present invention is not limited solely to the embodiments which have been described by way of example with reference to the accompanying drawings and that the scope of this patent also extends to alternative forms of all or part of the arrangements herein described which remain within the definition of equivalent means as well as to all applications of such arrangements.

What is claimed is:

1. An apparatus for non-destructively testing the characteristics of an electrically conductive material comprising:
    an oscillator circuit which includes an inductive winding connected therewith, said material to be tested being inductively coupled with said oscillator circuit winding;
    means for generating and supplying an alternating current voltage to said oscillator circuit winding so as to generate eddy-currents in said material; and
    means for indicating the output of said oscillator circuit in response to eddy-currents in said material with respect to the frequency of said alternating current voltage supplied to said oscillator circuit winding,
    wherein said inductive winding is coupled at one terminal thereof to a first electrode of an active element included in said oscillator circuit and at another terminal thereof to another electrode of said active element and wherein the first electrode of said active element serves as the cathode and is connected to an intermediate point of said winding and said means for indicating the output of said oscillator circuit according to said frequency of said alternating current is connected to the said another electrode of said active element which serves as the grid of said active element, the oscillator output being the variations in the grid voltage which voltage corresponds to the voltage developed across said winding and further including means, connected to said alternating current voltage generating and supplying means, for controlling the frequency of the current supplied thereby to said oscillator circuit winding, the alternating current voltage generating means providing a signal, the frequency of which is dependent upon the output of said control means, wherein said frequency control means comprises a generator for producing saw-toothed signals which increase along a linear ramp in successive steps and connected to said alternating-current voltage generating means which serves to vary the frequency in a series of the uniformly spaced stages having a duration corresponding substantially to the time required to ensure that a material under inspection which is driven in translational motion by suitable transfer means should traverse one pass within said winding.

2. An apparatus according to claim 1, wherein said indicating means comprises a peak-to-peak detector circuit to which said voltage variations are applied, an assembly of analog storage devices which are connected to the output of said detector circuit and an oscilloscope into which the content of said storage devices can be transferred, and wherein said apparatus further comprises a synchronization means coupled to said alternating current voltage generating means and to a drive means coupled to said material to move said material within said winding for synchronizing the switching of said storage devices and the control of means for passing said material through said winding in order that each material under inspection traverses a given number of passes inside the winding.

3. An apparatus for non-destructively testing the characteristics of an electrically conductive material comprising:
    an oscillator circuit which includes an inductive winding connected therewith, said material to be tested being inductively coupled with said oscillator circuit winding;
    means for generating and supplying an alternating current voltage to said oscillator circuit winding so as to generate eddy-currents in said material; and
    means for indicating the output of said oscillator circuit in response to eddy-currents in said material with respect to the frequency of said alternating current voltage supplied to said oscillator circuit winding,
    wherein said inductive winding is coupled at one terminal thereof to a first electrode of an active element included in said oscillator circuit and at another terminal thereof to another electrode of said active element and wherein the first electrode of said active element serves as the cathode and is connected to an intermediate point of said winding and said means for indicating the output of said oscillator circuit according to said frequency of said alternating current is connected to the said another electrode of said active element which serves as the grid of said active element, the oscillator output being the variations in the grid voltage which voltage corresponds to the voltage developed across said winding and further including means, connected to said alternating current voltage generating and supplying means, for controlling the frequency of the current supplied thereby to said oscillator circuit winding, the alternating current voltage generating means providing a signal, the frequency of which is dependent upon the output of said control means, and wherein said frequency control means comprises a direct-current voltage generator having a plurality of outputs which deliver voltages having different values and a selector switch for successively applying said direct-current voltages to the alternating-current voltage generating means in order that the frequency thereof will assume a number of different values wherein said apparatus comprises a program device which is adapted to initiate a sequence of several passes within the winding in the case of each material to be inspected and at the same time to cause a change of position of said selector switch for each pass, a threshold circuit for receiving the grid voltage of the active element and a storage device connected to the output of said threshold circuit for recording the triggering of said circuit at each pass and said storage device being intended to control an apparatus for the removal of defective parts according to the information which is recorded.

4. An apparatus for non-destructively testing the characteristics of an electrically conductive material comprising:
   an oscillator circuit which includes an inductive winding connected therewith, said material to be tested being inductively coupled with said oscillator circuit winding;
   means for generating and supplying an alternating current voltage to said oscillator circuit winding so as to generate eddy-currents in said material; and
   means for indicating the output of said oscillator circuit in response to eddy-currents in said material with respect to the frequency of said alternating current voltage supplied to said oscillator circuit winding,
   wherein said inductive winding is coupled at one terminal thereof to a first electrode of an active element included in said oscillator circuit and at another terminal thereof to another electrode of said active element and wherein the first electrode of said active element serves as the cathode and is connected to an intermediate point of said winding and said means for indicating the output of said oscillator circuit according to said frequency of said alternating current is connected to the grid another electrode of said active element which serves as the grid of said active element, the oscillator output being the variations in the grid voltage which voltage corresponds to the voltage developed across said winding and further including means, connected to said alternating current voltage generating and supplying means, for controlling the frequency of the current supplied thereby to said oscillator circuit winding, the alternating current voltage generating means providing a signal, the frequency of which is dependent upon the output of said control means, wherein said frequency control means comprises a saw-tooth signal generator connectable to said alternating-current voltage generating means for causing said frequency to vary cyclically and continuously, a generator for producing saw-tooth signals which increase in successive steps, connectable to said alternating current voltage generating means for varying said frequency in a series of uniformly spaced stages having a duration corresponding substantially to the time required to ensure that a material under inspection will traverse one pass through said winding, and including means for displacing said material within said winding, and a direct-current voltage generator having a plurality of outputs which deliver voltages having different values and a selector switch connectable to said alternating-current voltage generator means for successively applying said direct-current voltages to said alternating current voltage generating means in order that the frequency thereof will assume a number of different values in succession and further including a selector switch for selective connecting one of said continuously and cyclically varying saw-tooth signal generator, said successive step increasing saw-tooth signal generator and said direct-current voltage generator to said alternating current voltage generating means.

* * * * *